United States Patent
Yon et al.

(10) Patent No.: US 12,188,830 B2
(45) Date of Patent: Jan. 7, 2025

(54) METHOD FOR MANUFACTURING A MICROBOLOMETER WITH THERMISTOR MATERIAL MADE FROM VANADIUM OXIDE HAVING IMPROVED PERFORMANCES

(71) Applicant: COMMISSARIAT À L'ENERGIE ATOMIQUE ET AUX ÉNERGIES ALTERNATIVES, Paris (FR)

(72) Inventors: Jean-Jacques Yon, Grenoble (FR); Denis Pelenc, Grenoble (FR)

(73) Assignee: COMMISSARIAT À L'ENERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 922 days.

(21) Appl. No.: 17/275,025

(22) PCT Filed: Oct. 22, 2019

(86) PCT No.: PCT/FR2019/052501
§ 371 (c)(1),
(2) Date: Mar. 10, 2021

(87) PCT Pub. No.: WO2020/084242
PCT Pub. Date: Apr. 30, 2020

(65) Prior Publication Data
US 2022/0065700 A1 Mar. 3, 2022

(30) Foreign Application Priority Data
Oct. 24, 2018 (FR) ........................................ 1859809

(51) Int. Cl.
*H01F 7/06* (2006.01)
*G01J 5/04* (2006.01)
*G01J 5/20* (2006.01)

(52) U.S. Cl.
CPC ................. *G01J 5/20* (2013.01); *G01J 5/046* (2013.01)

(58) Field of Classification Search
CPC ..................................... G01J 5/046; G01J 5/20
See application file for complete search history.

(56) References Cited

U.S. PATENT DOCUMENTS 10,825,936 B2 * 11/2020 Frey ....................... G02B 5/288
2010/0243896 A1 9/2010 Geneczko
(Continued)

FOREIGN PATENT DOCUMENTS

EP 2 894 444 A1 7/2015

OTHER PUBLICATIONS

International Search Report issued Feb. 7, 2020 in PCT/FR2019/052501 filed Oct. 22, 2019, 2 pages.

*Primary Examiner* — Paul D Kim
(74) *Attorney, Agent, or Firm* — Oblon, McClelland, Maier & Neustadt, L.L.P.

(57) ABSTRACT

A process for fabricating a microbolometer includes producing a membrane containing a thermistor material, which is made of a first compound based on vanadium oxide and which is formed from a central segment. The central segment covers an intermediate insulating layer, and the thermistor material is formed from lateral segments, which make contact with biasing electrodes through apertures. The process also includes incorporating locally, by ion implantation, into the lateral segments an amount of an additional chemical element higher than or equal to the effective amount. The electrical resistivity ρL at room temperature of the compound thus modified is lower than or equal to 10% of the electrical resistivity ρc at room temperature of the first compound.

9 Claims, 3 Drawing Sheets

(56) References Cited

U.S. PATENT DOCUMENTS

2015/0192473 A1   7/2015  Pelenc et al.
2018/0016187 A1*  1/2018  Gu .................... C03C 17/245
2020/0088585 A1*  3/2020  Cortial ................ G01J 5/20

* cited by examiner

METHOD FOR MANUFACTURING A MICROBOLOMETER WITH THERMISTOR MATERIAL MADE FROM VANADIUM OXIDE HAVING IMPROVED PERFORMANCES

TECHNICAL FIELD

The field of the invention is that of devices for detecting electromagnetic radiation, for example infrared or terahertz electromagnetic radiation, comprising at least one resistive thermal detector comprising a thermistor material based on vanadium oxide. The invention is applicable notably to the field of infrared imaging, of thermography or of gas detection.

PRIOR ART

A device for detecting electromagnetic radiation may comprise a matrix-array of resistive thermal detectors, also called microbolometers, each microbolometer comprising an absorbent segment capable of absorbing the electromagnetic radiation to be detected.

Figure 1:
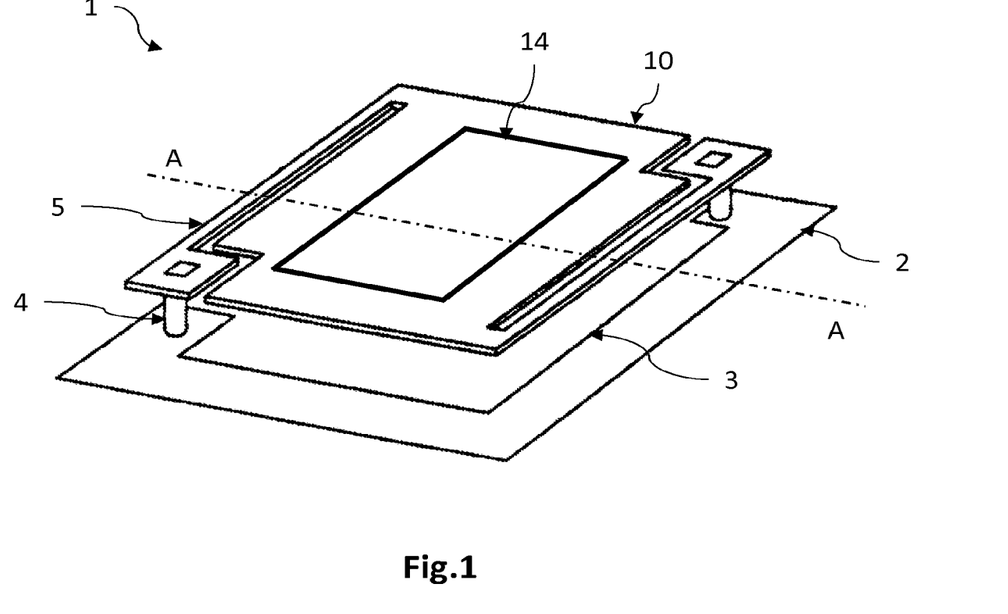
FIG. 1, which has already been described, is a perspective, schematic and partial view of an example of a microbolometer according to the prior art.

FIG. 1 is a perspective view of an example of a microbolometer 1 according to the prior art, here suitable for absorbing infrared electromagnetic radiation in the LWIR (long wavelength infrared) spectral band, the wavelengths of which are comprised between about 8 µm and 14 µm.

Here and for the remainder of the description, a direct three-dimensional orthogonal coordinate system (X, Y, Z) is defined, in which the XY-plane is substantially parallel to the plane of a substrate 2 on which the microbolometer 1 rests, the Z-axis being oriented in a direction substantially orthogonal to the plane of the substrate 2 toward the absorbent membrane 10. Moreover, the terms "lower" and "upper" are understood to relate to positions of increasing distance from the substrate 2 in the +Z-direction.

The microbolometer 1 comprises an absorbent membrane 10 that is suspended above a read substrate 2 by anchoring pillars 4 and that is thermally insulated from the substrate by thermally insulating arms 5. These anchoring pillars 4 and thermally insulating arms 5 also perform an electrical function in that they electrically connect the absorbent membranes 10 to a read circuit that is generally placed in the substrate 2.

The membrane 10 here comprises an absorber suitable for absorbing the electromagnetic radiation to be detected and a thermistor material 14 making thermal contact with the absorber. The thermistor material 14 is a material that has an electrical resistance that varies with its temperature. It may be amorphous silicon or a vanadium oxide. The absorbent membrane 10 is spaced from the substrate 2, and in particular from a reflective layer 3, by a non-zero distance, which is preferably adjusted so as to form a quarter-wave interference cavity that optimizes the absorption by the absorbent membrane 10 of the electromagnetic radiation to be detected.

The performance of the microbolometer 1 is notably limited by the noise associated with the thermistor material 14. Thus, as known, the total noise $i_{n,tot}$ associated with the thermistor material (here current noise) is the sum of Johnson noise resulting from the thermal agitation of the charge carriers, of 1/f flicker noise (low-frequency noise) resulting in particular from fluctuations in the mobility and/or density of the carriers, and of noise resulting from fluctuations in the temperature of the membrane 10.

There is a constant need to improve the performance of the microbolometer, and notably to decrease the noise associated with the thermistor material.

The document US2010/0243896A1 describes a process for fabricating a microbolometer based on VOx. To avoid using a metal such as NiCr in the thermally insulating arms, the VOx is also deposited in the thermally insulating arms and makes contact with the electrical conductor of the anchoring pillars. Ion implantation is carried out locally in the VOx, here above the anchoring pillars, in the thermally insulating arms, and on the border of the absorbent membrane, so as to decrease the electrical resistivity of the VOx thus modified.

DISCLOSURE OF THE INVENTION

The objective of the invention is to at least partially remedy the drawbacks of the prior art, and more particularly to provide a process for fabricating at least one microbolometer comprising a membrane intended to be suspended above a substrate and comprising a thermistor material based on vanadium oxide, that allows a microbolometer with an improved performance to be obtained.

To this end, the subject of the invention is a process for fabricating at least one microbolometer, comprising the following steps:
  producing anchoring pillars that extend from a substrate, and that each comprise an electrical conductor;
  producing thermally insulating arms that each comprise a layer of a metal making contact with the electrical conductor of the anchoring pillar and forming a biasing electrode;
  producing a membrane that is intended to be suspended above the substrate by the anchoring pillars and the thermally insulating arms, and that contains:
    said biasing electrodes,
    an insulating layer called the intermediate insulating layer, which partially covers the biasing electrodes and contains apertures that open onto the biasing electrodes,
    a thermistor material, which is made of a first compound based on vanadium oxide and which is continuously formed from a segment called the central segment, which covers the intermediate insulating layer, and from segments called the lateral segments, which make contact with the biasing electrodes through the apertures. The first compound is also called the 'base compound'.

According to the invention, the process furthermore comprises the following steps:
  determining a non-zero amount, called the effective amount, of at least one additional chemical element that, when incorporated by ion implantation into the first compound, forms a compound, called the modified compound, the electrical resistivity $\rho_L$ of which at room temperature is lower than or equal to 10% of the electrical resistivity $\rho_c$ at room temperature of said first compound;
  incorporating locally, by ion implantation, into the lateral segments of the thermistor material, an amount of said additional chemical element higher than or equal to the effective amount.

The following are certain preferred but nonlimiting aspects of this fabricating process.

The additional chemical element is advantageously chosen from nitrogen, carbon, silicon, phosphorus, germanium, and arsenic. The additional chemical element is preferably chosen from nitrogen and carbon. The additional chemical element is preferably nitrogen.

The thermistor material may comprise a substantially identical amount x of oxygen in the central segment and in the lateral segments, x being the proportion of oxygen with respect to vanadium.

The thermistor material may comprise an amount x of oxygen such that the electrical resistivity at room temperature of the first compound of the thermistor material in the central segment is comprised between 5 Ω·cm and 50 Ω·cm, x being the proportion of oxygen with respect to vanadium. The amount x of oxygen is preferably comprised between 1.6 and 2.2.

The modified compound of the thermistor material may comprise an amount y of the additional chemical element higher than or equal to 0.045, y being the proportion of the additional chemical element with respect to vanadium.

The ion implantation step may comprise depositing, on the thermistor material, a photoresist containing implantation apertures located facing the apertures in the intermediate insulating layer, the photoresist having a suitable thickness so as to prevent the additional chemical element from being incorporated into the central segment.

BRIEF DESCRIPTION OF THE DRAWINGS

Other aspects, aims, advantages and features of the invention will become more clearly apparent on reading the following detailed description of preferred embodiments thereof, this description being given by way of nonlimiting example and with reference to the appended drawings, in which.

DETAILED DISCLOSURE OF PARTICULAR EMBODIMENTS

In the figures and in the remainder of the description, the same references have been used to designate identical or similar elements. In addition, the various elements have not been shown to scale so as to improve the clarity of the figures. Moreover, the various embodiments and variants are not mutually exclusive and may be combined with one another. Unless otherwise indicated, the terms "substantially", "about" and "of the order of" mean to within 10%, and preferably to within 5%. Moreover, the expression "comprising a" must be understood to mean "comprising at least one" and not to mean "comprising a single", unless otherwise indicated.

The indications relating to the chemical composition of a compound are expressed using its empirical chemical formula, which is conventionally expressed with respect to one (1) vanadium atom. Thus, for a compound $VO_xA_y$, which is mentioned here purely by way of illustration, where A is an additional chemical element, the value x is the number of oxygen atoms per 1 atom of vanadium (relative proportion of oxygen with respect to vanadium), and the value y is the number of atoms of the element A for 1 atom of vanadium (relative proportion of the element A with respect to vanadium). The value of the amount of the chemical element is given to within 10%. Moreover, the atomic proportion of each chemical element in the compound $VO_xA_y$ is $1/(1+x+y)$ for vanadium, $x/(1+x+y)$ for oxygen, and $y/(1+x+y)$ for the element A.

The invention relates to a process for fabricating at least one resistive thermal detector, also called a microbolometer, comprising a thermistor material based on vanadium oxide $VO_x$. The microbolometer may be designed to detect infrared or terahertz radiation. In the remainder of the description, it is particularly suitable for detecting infrared radiation in the LWIR (long wavelength infrared) range, the wavelength of which is comprised between about 8 μm and 14 μm.

The microbolometer comprises a membrane suspended above a read substrate and advantageously isolated from the latter by thermally insulating arms. The membrane comprises a thermistor material, i.e. a material the electrical resistance of which varies with its temperature.

In the context of the invention, the thermistor material is based on vanadium oxide $VO_x$, i.e. it is a compound comprising a vanadium oxide $VO_x$ and, locally, at least one additional chemical element denoted A. In other words, in the context of the invention, the thermistor material comprises a first segment, called the central segment, made based on $VO_x$ without the additional chemical element A, and second segments, called the lateral segments, that are separate from each other and that are made based on $VO_xA_y$, i.e. based on $VO_x$ containing a non-zero amount y of the additional chemical element A.

In the remainder of the description, the thermistor material located in the central segment and therefore not comprising the additional chemical element A incorporated by ion implantation is called the 'base compound'. It may comprise chemical elements other than vanadium and oxygen, which might have been incorporated during growth. It may thus comprise the additional chemical element A, which might then have been incorporated during the growth of the base compound. Moreover, the thermistor material located in the lateral segments, and formed of the base compound and of the additional chemical element A incorporated by ion implantation, is called the 'modified compound'.

The thermistor material is preferably chosen so that the base compound has an electrical resistivity at room temperature comprised between about 5 Ω·cm and 50 Ω·cm, and preferably comprised between about 7 Ω·cm and 30 Ω·cm. To this end, the relative proportion x of oxygen with respect to vanadium is comprised between about 1.6 and 2.2, and preferably comprised between 1.8 and 2.0. It may however have a different relative proportion x. By way of illustration, the compound of empirical chemical formula $VO_2$ comprises 2 oxygen atoms per 1 vanadium atom (x=2), the compound $V_2O_3$ contains 3 oxygen atoms per 2 vanadium atoms (x=1.5), and the compound $V_2O_5$ contains 5 oxygen atoms per 2 vanadium atoms (x=2.5). The thermistor material may be an amorphous material or a crystalline material with one or more crystalline phases. It may also take the form of a mixture of an amorphous phase and one or more crystalline phases.

The additional chemical element A is defined as being a chemical element that is added voluntarily, by ion implantation and locally, to the thermistor material, and that allows the electrical resistivity at room temperature of the thermistor material to be decreased by at least a factor of 10.

More precisely, the modified compound $VO_xA_y$ located in the lateral segments comprises an amount y of the additional chemical element A higher than or equal to an amount, called the effective amount $y_{eff}$, that causes its electrical resistivity $\rho_L$ at room temperature to be lower than or equal to 10% of the electrical resistivity $\rho_c$ at room temperature of the base compound located in the central segment. In other words, $\rho_L$ is lower than or equal to about $\rho_c/10$, preferably lower than or equal to about $\rho_c/50$, and preferably lower than or equal to about $\rho_c/200$. The room temperature may for example be comprised between 20° C. and 30° C. Thus, for an electrical resistivity $p_c$ at room temperature of the base compound $VO_x$ equal to about 10 $\Omega \cdot cm$, the modified compound $VO_xA_y$ comprises an amount y of the additional chemical element A such that the electrical resistivity $\rho_L$ at room temperature is lower than or equal to 1 $\Omega \cdot cm$, preferably lower than or equal to 0.2 $\Omega \cdot cm$, and more preferably lower than or equal to 0.05 $\Omega \cdot cm$.

Figure 2A:
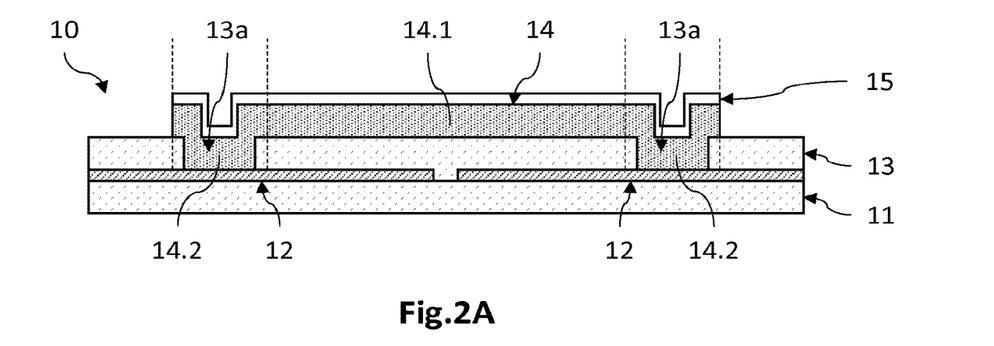
FIGS. 2A to 2C are schematic and partial cross-sectional views of two examples of absorbent membranes (FIGS. 2A and 2B) of a microbolometer according to one embodiment, and of a microbolometer (FIG. 2C) comprising the absorbent membrane illustrated in FIG. 2A.
Figure 2B:
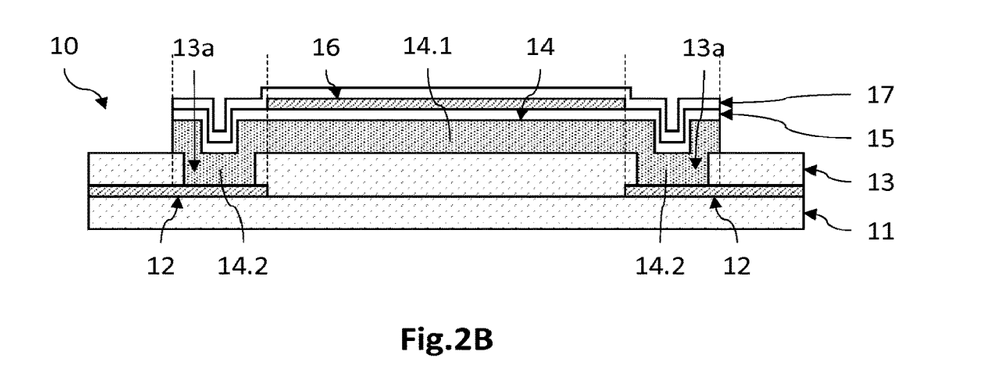
Figure 2C:
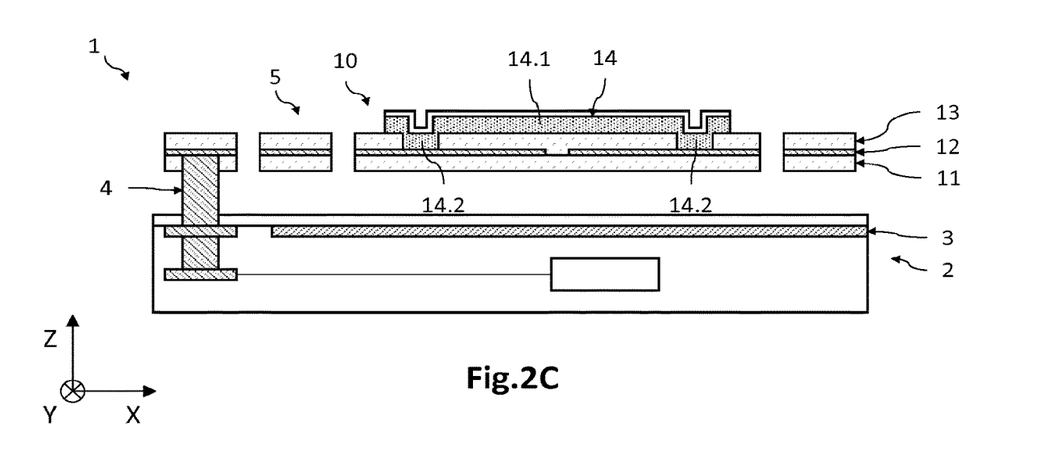

FIGS. 2A to 2C are schematic and partial views, in cross section along the plane A-A illustrated in FIG. 1, of two variants of an absorbent membrane 10 suspended above a read substrate, according to one embodiment of the microbolometer 1. The XYZ coordinate system was defined above.

With reference to FIG. 2A, the absorbent membrane 10 may comprise a lower insulating layer 11 on which there rest two biasing electrodes 12. The lower insulating layer 11 is here made of a dielectric, and for example of a silicon oxide, silicon nitride or silicon oxynitride, with a thickness for example comprised between 10 nm and 100 nm, and preferably comprised between 30 nm and 50 nm. It may participate in ensuring the stiffness of the thermally insulating arms.

The biasing electrodes 12 are made of an electrical conductor, and for example of a metal chosen from Ti, TiN, TaN and WN, inter alia, and for example has a thickness comprised between 5 nm and 20 nm. They are here advantageously made of a material that is absorbent with respect to the electromagnetic radiation to be detected and thus form the absorber. The biasing electrodes 12 are coplanar and are physically separate and electrically insulated from each other. They are advantageously dimensioned thicknesswise so that they have a sheet resistance substantially equal to 377 $\Omega$/square, thus allowing the absorption of the electromagnetic radiation to be detected to be optimized.

The biasing electrodes 12 are partially coated with an intermediate insulating layer 13 that is here made of a dielectric, and for example of a material identical or similar to that of the lower insulating layer 11, and may also have a thickness of the order of a few tens of nanometers, and for example comprised between 10 nm and no nm, and preferably comprised between about 30 nm and 50 nm. This layer may participate in ensuring, with the lower insulating layer 11, the stiffness of the thermally insulating arms.

The intermediate insulating layer 13 is structured to have at least two apertures 13a that open onto the biasing electrodes 12. The apertures 13a thus have a height along the Z-axis corresponding to the thickness of the intermediate insulating layer 13. They are bounded by the sidewalls of the intermediate insulating layer 13, which extend vertically substantially parallel to the Z-axis. They may have a transverse dimension, or width, in the XY-plane, comprised between 200 nm and 1000 nm, and for example equal to about 500 nm.

A thermistor material 14 based on vanadium oxide $VO_x$ at least partially covers the intermediate insulating layer 13, and makes contact with each of the two biasing electrodes 12 through the apertures 13a. It has a thickness that is for example comprised between 20 nm and 200 nm, and preferably comprised between 40 nm and 80 nm. Preferably, the relative proportion of oxygen x is such that the electrical resistivity of the thermistor material 14 at room temperature is comprised between 5 $\Omega \cdot cm$ and 50 $\Omega \cdot cm$, and preferably comprised between 7 $\Omega \cdot cm$ and 30 $\Omega \cdot cm$.

The thermistor material 14 is therefore continuously formed from a central segment 14.1 and from at least two lateral segments 14.2. The central segment 14.1 extends in a substantially planar manner over the intermediate insulating layer 13, and the two lateral segments 14.2 extend from the central segment 14.1 to make contact with the biasing electrodes 12, through the apertures 13a formed in the intermediate insulating layer 13. The central segment 14.1 thus has an essentially two-dimensional topology while the lateral segments 14.2 have an essentially three-dimensional topology.

Lastly, the thermistor material 14 is here advantageously covered with an upper protective layer 15, which is for example made of a silicon nitride SiN or a silicon oxide SiO, with a typical thickness of about 10 nm, which allows any contamination or degradation of the thermistor material 14, in particular during the removal of sacrificial layers used to fabricate the thermal detector, to be avoided.

FIG. 2B illustrates an absorbent membrane 10 according to one variant embodiment. The membrane differs from that described with reference to FIG. 2A essentially in that the biasing electrodes 12 do not perform the function of optical absorber. However, as described above, the central segment 14.1 of the thermistor material 14 covers an intermediate insulating layer 13 and the two lateral segments 14.2 of said thermistor material make contact with the biasing electrodes 12.

In this example, the intermediate insulating layer 13 is made of a semiconductor, amorphous silicon for example, and not of a dielectric. Preferably, the lower insulating layer 11 is made of a semiconductor that is identical or similar, in terms of electrical resistivity, to that of the intermediate insulating layer 13. Such a material usually has low thermal conductivity, this allowing the thermal insulation of the absorbent membrane 10 to be improved, in particular when the lower and intermediate insulating layers 11, 13 extend into the thermally insulating arms. The insulating layers 11, 13 may thus be made of amorphous silicon with an electrical resistivity higher than or equal to about 1000 $\Omega \cdot cm$ and with a thickness equal to about 40 nm.

The two biasing electrodes 12 are laterally spaced apart from one another by a distance of the order of the distance that separates the apertures 13a, provision however being made for a margin of safety (100 to 500 nm) so as to guarantee that the apertures 13a do not straddle the edge of the electrodes 12, so as to ensure the electrical insulation of the two biasing electrodes 12 with respect to each other. To compensate for the decrease in the absorption of the electromagnetic radiation by the biasing electrodes 12, an additional absorption layer 16, which is for example made of TiN with a thickness of 8 nm, is deposited on the upper protective layer 15 plumb with the lateral spacing between the two biasing electrodes 12. An additional protective layer 17 advantageously covers the absorption layer 16.

FIG. 2C is a schematic and partial cross-sectional view of a detecting device 1 comprising an absorbent membrane 10 such as illustrated in FIG. 2A. It comprises anchoring pillars 4 and thermally insulating arms 5 that keep the absorbent membrane 10 suspended above the substrate 2, and ensure the electrical connection of said absorbent membrane to a read circuit that is advantageously located in the substrate 2. The anchoring pillars 4 thus comprise an electrical conductor, preferably a metal, and here extend along the Z-axis. The thermally insulating arms 5 each comprise the biasing-electrode layer 12, and here extend in the XY-plane from the anchoring pillars. The layer 12 thus extends in the thermally insulating arms 5 from the anchoring pillars 4 to the absorbent membrane 10. The thermistor material 14 extends only over the absorbent membrane 10, and neither extend into the thermally insulating arms 5 nor to above the anchoring pillars 4.

The inventors have observed that, in this configuration where the thermistor material 14 locally makes contact with the biasing electrodes 12 through the apertures 13a, the thermal detector exhibits an excess 1/f noise when the thermistor material 14 is made from vanadium oxide $VO_x$. It will be recalled that 1/f noise, which is also called flicker noise or low-frequency noise, stems in particular from fluctuations in the mobility and/or density of free carriers. Specifically, it would appear that such an excess 1/f noise is not noticeably present when the thermistor material 14 is made of other thermistor materials, amorphous silicon for example. In addition, it would also appear that such an excess 1/f noise is not noticeably present when the thermistor material 14 based on vanadium oxide $VO_x$ extends in a substantially planar manner. It may be concluded from this that this excess 1/f noise is essentially associated with the lateral segments 14.2 of the thermistor material 14 based on vanadium oxide VON.

Thus, the total noise $i_{n,tot}$ associated with the thermistor material 14 (here current noise) comprises a first component $i_{n,c}$ associated with the central segment 14.1, and a second component $i_{n,L}$ associated with the lateral segments 14.2. This component $i_{n,L}$, which is of high value, degrades the performance of the microbolometer 1.

To improve the performance of the microbolometer 1, and in particular to counteract the excess 1/f noise of the thermistor material 14, provision is made, in the fabricating process for the microbolometer 1, to incorporate, into the lateral segments 14.2, by ion implantation, at least one additional chemical element A such that the electrical resistivity $\rho_L$ at room temperature of the modified compound $VO_xA_y$ located in the lateral segments 14.2 is lower than or equal to 10% of the electrical resistivity $\rho_c$ at room temperature of the base compound $VO_x$ located in the central segment 14.1. Specifically, as explained in detail below, the low electrical resistivity $\rho_L$ of the lateral segments 14.2 with respect to the electrical resistivity $\rho_c$ of the central segment 14.1 allows the excess 1/f noise present in the lateral segments 14.2 to be counteracted, and thus the performance of the microbolometer 1 to be improved.

The additional chemical element A is preferably chosen from nitrogen N, carbon C, silicon Si, phosphorus P, germanium Ge, and Arsenic As. Specifically, the inventors have observed that ion implantation of at least one of these additional chemical elements into the base compound $VO_x$ to obtain the modified compound $VO_xA_y$ allows electrical resistivity at room temperature to be greatly decreased. The inventors have observed that such a decrease in electrical resistivity at room temperature is not obtained when the additional chemical element A is incorporated during the growth of the thermistor material 14, i.e. when the relative proportion of oxygen x remains unchanged. Moreover, other chemical elements, such as boron B for example, incorporated by ion implantation do not allow such a decrease in electrical resistivity at room temperature to be obtained.

As such, the inventors have thus observed that ion implantation of nitrogen into a base compound of vanadium oxide $VO_x$ with x=about 1.8, and with an atomic proportion of nitrogen of the order of 4%, results in the formation of a modified compound $VO_{1.8}A_{0.112}$ exhibiting an electrical resistivity at room temperature of the order of 0.05 Ω·cm, much lower than the electrical resistivity equal to about 10 Ω·cm of the compound of base $VO_{1.8}$. In comparison, the incorporation of the same atomic proportion of nitrogen during the growth of the thermistor material 14 leads to an electrical resistivity at room temperature of the order of 10 Ω·cm, i.e. substantially equal to the electrical resistivity of the base compound $VO_{1.8}$. The incorporation of nitrogen during growth may be achieved by depositing the material in a reactive medium achieved by injecting a low pressure of molecular nitrogen $N_2$ into the deposition reactor. Ion implantation of such an additional chemical element A into the base compound $VO_x$ therefore allows, surprisingly, unlike incorporation during growth, a large decrease in the electrical resistivity of the material to be obtained.

Thus, the process for fabricating the microbolometer 1 according to one embodiment comprises a first step of producing the membrane that is intended to be suspended above a substrate and that contains two biasing electrodes 12 coated with the intermediate insulating layer 13, which contains two apertures 13a that open onto the biasing electrodes 12, the thermistor material 14 based on vanadium oxide covering the intermediate insulating layer 13 and making contact with the biasing electrodes 12 through the apertures 13a. These production steps are here similar or identical to those notably described in U.S. Pat. No. 9,933,309. The following steps here relate to the fabrication of the absorbent membrane to illustrated in FIGS. 2A and 2C. It comprises steps of producing the anchoring pillars 4 and the thermally insulating arms 5.

To do this, the lower insulating layer 11 is deposited on a sacrificial layer that covers the read substrate and through which anchoring pillars extend. The lower insulating layer 11 may be made of silicon nitride with a thickness comprised between 30 nm and 50 nm. The anchoring pillars extend from the read substrate, preferably along a Z-axis substantially orthogonal to the XY-plane of the substrate. They each comprise an electrical conductor, and participate in ensuring the electrical connection of the absorbent membrane 10 to the read circuit.

A conductive layer intended notably to form the biasing electrodes 12 is then deposited. The conductive layer is for example made of TiN, and has a thickness for example comprised between 5 nm and 20 nm. The conductive layer is then structured by photolithography and etching, so as to form the two biasing electrodes 12. These are separate and electrically insulated from each other by a lateral spacing in the XY-plane.

The intermediate insulating layer 13 is then deposited so as to cover the lower insulating layer 11 and the biasing electrodes 12. It thus extends into the lateral spacing between the biasing electrodes 12. It is preferably made of a dielectric identical to that of the lower insulating layer 11 and has a thickness preferably comprised between 30 nm and 50 nm.

The apertures 13a are then formed through the intermediate insulating layer 13, by photolithography and localized etching, so that they open onto the biasing electrodes 12. The apertures 13a are then bounded transversely by the sidewalls of the intermediate insulating layer 13.

Next, the base compound $VO_x$ of the thermistor material 14 is deposited, so as to cover the intermediate insulating layer 13 and to make contact with the biasing electrodes 12 through the apertures 13a. The thermistor material is here produced by ion beam sputtering (IBS), and for example by sputtering a vanadium target in an oxidizing atmosphere with a partial oxygen pressure. It has a thickness allowing a central segment 14.1, which rests on the intermediate insulating layer 13, and two lateral segments 14.2, which extend from the central segment 14.1 into the apertures 13a to make contact with the biasing electrodes 12, to be continuously formed. The lateral segments 14.2 are placed on either side of the central segment 14.1. The thickness of the thermistor material 14 is comprised between 20 nm and 200 nm, and preferably between 40 nm and 80 nm.

At this stage, the thermistor material 14 is formed from the base compound, here $VO_x$, and does not contain any additional chemical element A. The relative proportion of oxygen x is advantageously comprised between about 1.8 and 2.0 so that the electrical resistivity at room temperature is of the order of 10 Ω·cm to 20 Ω·cm. The thermistor material 14 thus has an electrical resistivity at room temperature that is substantially uniform within the material. As mentioned above, the central segment 14.1 has an electrical resistance $R_c$ and a low noise $i_{n,c}$ (planar topology), and the lateral segments 14.2 have an electrical resistance $R_L$ lower than $R_c$, 5 to 10 times lower for example, and a high noise (three-dimensional topology).

A protective upper layer 15, for example silicon nitride with a thickness of about 10 nm, is then preferably deposited so as to cover the thermistor material 14. This protective layer allows the properties of the thermistor material 14 to be preserved during a subsequent step of removing the sacrificial layers.

The process moreover comprises a step of determining the effective amount $y_{eff}$ of the additional chemical element A to be incorporated into the lateral segments 14.2 of the thermistor material 14 by ion implantation, so that the electrical resistivity $\rho_L$ of the modified compound located in the lateral segments 14.2 is lower than or equal to 10% of the electrical resistivity pc of the base compound located in the central segment 14.1.

Figure 3:
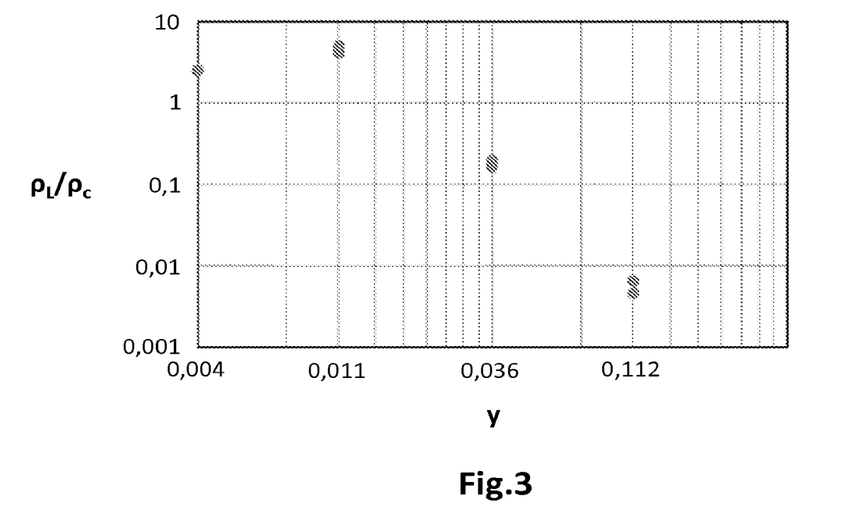
FIG. 3 illustrates an example of the variation in the electrical resistivity $\rho_L$ at room temperature of the modified compound $VO_xA_y$ of the thermistor material divided by the electrical resistivity $\rho_c$ of its base compound $VO_x$, for various values y of the amount of additional chemical A.

Thus, the effective amount $y_{eff}$ may be determined by experimental trials. Thus, FIG. 3 illustrates an example of the variation in the electrical resistivity $\rho_L$ of the thermistor material 14 $VO_xN_y$, in which the additional chemical element A incorporated by ion implantation in the base compound is nitrogen, for various values of the amount y of nitrogen. In this example, the values of the electrical resistivity $\rho_L$ are divided by the value $\rho_c$ of the electrical resistivity of the base compound.

In this example, the base compound $VO_x$ of the thermistor material 14 was produced by ion beam sputtering (IBS) by sputtering a vanadium target in an oxidizing atmosphere with a partial oxygen pressure. The relative proportion x of oxygen was equal to about 1.8, so that the electrical resistivity pc at room temperature of the base compound $VO_{1.8}$ was equal to about 10 Ω·cm. The thickness of the base compound $VO_{1.8}$ was equal to about 80 nm, and the base compound $VO_{1.8}$ was coated with a layer of 10 nm of silicon nitride. The modified compound $VO_{1.8}N_y$ was then obtained by incorporating nitrogen by ion implantation into the base compound $VO_{1.8}$. Four samples of the modified compound $VO_{1.8}N_y$ were obtained with various nitrogen implantation doses, namely $1 \times 10^{15}$ cm$^{-2}$, $3 \times 10^{15}$ cm$^{-2}$, $1 \times 10^{16}$ cm$^{-2}$ and $3 \times 10^{16}$ cm$^{-2}$ (determined using the Athena software package sold by Silvaco), and for an implantation energy of 25 keV (here in the case where the base compound was coated with a protective layer of silicon nitride of 10 nm thickness). The relative proportion of nitrogen y was equal to about 0.004, 0.011, 0.036 and 0.112, respectively (corresponding to an atomic proportion of 0.13%, 0.4%, 1.3%, 4%, respectively).

These experimental tests allowed the effective amount $y_{eff}$ of nitrogen required here for the electrical resistance $\rho_L$ of the modified compound $VO_{1.8}N_y$ to be lower than or equal to 10% of the electrical resistivity $\rho_c$ of the base compound $VO_{1.8}$. It would appear that for y=0.004 and y=0.011, the electrical resistivity $\rho_L$ is higher than or equal to the electrical resistivity $\rho_c$. However, for y=0.036, the electrical resistivity $\rho_L$ is substantially equal to $\rho_c/5$. Furthermore, for y=0.112, the electrical resistivity $\rho_L$ is substantially equal to $\rho_c/200$. Thus, it may be determined by interpolation that the effective amount $y_{eff}$ of nitrogen from which the electrical resistivity is lower than or equal to $\rho_c/10$, is substantially equal to 0.045.

Moreover, it would appear that the additional chemical element may be chosen from nitrogen N, carbon C, silicon Si, phosphorus P, germanium Ge, and Arsenic As, insofar as they all allow a modified compound $VO_xA_y$ having an electrical resistance $\rho_L$ lower than or equal to 10% of the electrical resistivity pc of the base compound $VO_x$ to be obtained. This large decrease in electrical resistivity is thus observed for these elements incorporated by ion implantation into the base compound.

By way of example, the table below indicates the value of the electrical resistivity $\rho_L$ at room temperature for various samples of modified compound $VO_xA_y$, in which the relative proportion of oxygen x is equal to about 1.8. The implantation dose of the additional chemical element A is equal to $3 \times 10^{16}$ cm$^{-2}$ and the implantation energy is also indicated (here for the case of a base layer made of $VO_x$ of 80 nm thickness coated with a protective layer of 10 nm of silicon nitride).

| Element A | Nitrogen | Carbon | Silicon | Phosphorus | Germanium | Arsenic |
|---|---|---|---|---|---|---|
| Energy | 25 keV | 21 keV | 47 keV | 48 keV | 95 keV | 98 keV |
| $\rho_L/\rho_c$ | 1/200 | 1/10 | 1/50 | 1/15 | 1/90 | 1/24 |

The additional chemical element A may advantageously be chosen from nitrogen, silicon and germanium, and preferably from nitrogen and germanium insofar as these elements allow a particularly low electrical resistivity to be obtained.

As a variant, the additional chemical element A may advantageously be chosen from nitrogen and carbon insofar as these elements allow a low electrical resistivity to be obtained with a lower implantation energy. In addition, these elements being light atoms, they cause hardly any modification of the physicochemical properties of the photoresist used during the ion implantation to define the implantation regions, thus the process used to strip the photoresist is not complexified. Specifically, under heavy ion bombardment, the surface of the photoresist may be modified, making it more complex to strip the photoresist.

Preferably, the additional chemical element A is nitrogen. Specifically, it would appear that the implanted nitrogen allows the electrical resistivity $\rho_L$ to be greatly decreased while allowing the photoresist used during the ion implantation to be stripped straightforwardly.

The implantation dose of the additional chemical element A may be selected so that the electrical resistance $\rho_L$ of the modified compound $VO_xA_y$ is substantially equal to 10% of the electrical resistivity $\rho_c$ of the base compound VON, or even lower. This may notably be the case with nitrogen, but also with silicon and germanium. Specifically, apart from the fact that the step of incorporating by ion implantation then has a shorter length and therefore a lower cost, the photoresist used to define the implantation regions exhibits a lesser modification of its physicochemical properties, thus simplifying the step of stripping the resist.

The process then comprises a step of incorporating, by ion implantation, the additional chemical element A in the lateral segments 14.2 of the thermistor material 14, and not in the central segment 14.1, in an amount higher than or equal to the effective amount $y_{eff}$, for example nitrogen so that the relative proportion y of nitrogen in the lateral segments 14.2 is higher than or equal to 0.045.

To do this, a photoresist is deposited on the thermistor material 14, and more precisely, on the upper protective layer 15, which is structured by photolithography to define implantation apertures located facing the apertures 13a of the intermediate insulating layer 13. The width of the implantation apertures of the photoresist is larger than or equal to that of the apertures, and preferably slightly larger in order to allow for a potential misalignment between the implantation apertures and the apertures 13a. The thickness of the photoresist is defined so as to avoid any incorporation of nitrogen into the central segment 14.1. The width of the implantation regions is delineated by the dashed lines in FIGS. 2A and 2B, thus defining laterally the lateral segments 14.2 formed from the modified compound $VO_xA_y$.

The nitrogen is incorporated by ion implantation into the lateral segments 14.2 of the thermistor material 14. The operational parameters of ion implantation are defined so that the peak of the implantation Gaussian is located in the middle of the thickness of the lateral segments 14.2. By way of example, an implantation dose of $3 \times 10^{16}$ cm$^{-2}$ at 25 keV allows an atomic proportion of nitrogen of about 4% (y=0.112) to be obtained in a compound $VO_x$ with a thickness of about 80 nm coated with a layer of about 10 nm of SiN. Due to the thickness of the photoresist, the properties of the central segment 14.1 are thus substantially unchanged. As mentioned above, the central segment 14.1 as a result then has an electrical resistance $R_c$ and a low noise $i_{n,c}$, the values of which are identical to the values before the ion implantation step, whereas the lateral segments 14.2 have an electrical resistance $R_L$ much lower than $R_c$ and for example 1500 times lower, while the noise $i_{n,L}$ thereof remains high. As explained below, due to the large decrease in the electrical resistivity $\rho_L$ and therefore in the electrical resistance $R_L$, the noise $i_{n,L}$ no longer has a noticeable impact on the performance of the microbolometer 1.

The photoresist is then stripped. The upper protective layer 15 may be kept, or even replaced by a new protective layer.

The protective layer and the thermistor material 14 are then structured, by photolithography and etching, so as to obtain an absorbent membrane 10 that is intended to be suspended.

Subsequently, the process comprises the following conventional steps for fabricating the microbolometer 1, i.e. steps such as structuring the thermally insulating arms (this, as a variant, may be carried out in a previous step), optionally producing an encapsulating structure defining an advantageously hermetic cavity housing one or more microbolometers 1, stripping sacrificial layers, generating a vacuum, etc. These steps are notably described in U.S. Pat. No. 9,933,309 and are not detailed here. The thermally insulating arms 5 extend from the anchoring pillars 4, preferably in an XY-plane parallel to the substrate 2. They comprise a layer 12 of an electrical conductor, preferably a metal, that makes electrical contact with the conductor of the anchoring pillars.

Thus, a thermistor material 14 the lateral segments 14.2 of which are made of the modified compound $VO_xA_y$, with y non-zero, and the central segment 14.1 of which is made of the base compound VON, is obtained. The relative proportion x of oxygen is substantially uniform throughout the thermistor material 14, i.e. it is substantially identical in the central segment 14.1 and in the lateral segments 14.2. Thus, the modified compound $VO_xA_y$ has an electrical resistivity $\rho_L$ at least lower than or equal to one tenth of the electrical resistivity $p_c$ of the base compound $VO_x$.

The fact that the thermistor material 14 has lateral segments 14.2 that make contact with biasing electrodes 12 of low electrical resistivity $\rho_L$ relative to that pc of the central segment 14.1 allows the performance of the microbolometer 1 to be improved. Specifically, because of the low electrical resistivity $\rho_L$ of the thermistor material 14 in the lateral segments 14.2, it would appear that the excess noise associated with the lateral segments 14.2, and in particular the excess 1/f noise, does not impact or hardly impacts the performance of the microbolometer 1.

Figure 4:
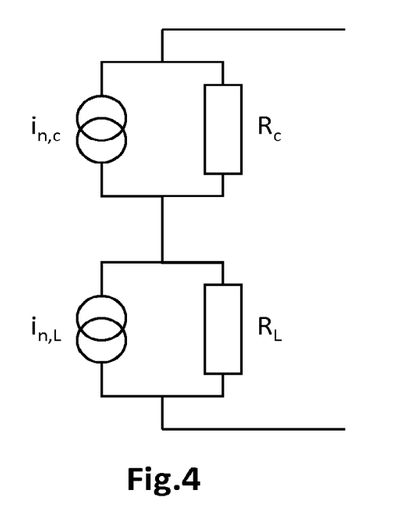
FIG. 4 illustrates an equivalent circuit diagram modeling the thermistor material of the microbolometer according to one embodiment.

To illustrate this, FIG. 4 shows an equivalent circuit diagram modeling the thermistor material 14 in the context of the invention.

Specifically, the thermistor material 14 may be modeled by a series connection of two electrical blocks. Each electrical block is formed by an electrical-resistance term R in parallel with a noise term in (here current noise). Thus, the first electrical block corresponds to the central segment 14.1 of the thermistor material 14, and is characterized by a high electrical resistance $R_c$ (electrical resistivity for example of the order of 10 Ω·cm) and a low noise $i_{n,c}$ insofar as the central segment 14.1 is planar. The second electrical block corresponds to the lateral segments 14.2 of the thermistor material 14, and is characterized by a very low electrical resistance $R_L$ (electrical resistivity for example of the order of 0.05 Ω·cm) and a high noise $i_{n,L}$ insofar as the lateral segments 14.2 have a three-dimensional topology.

The total noise $i_{n,tot}$ resulting from these two noise regions may be written:

$$i_{n,tot} = \sqrt{\left(\frac{R_c}{R_c + R_L} i_{n,c}\right)^2 + \left(\frac{R_L}{R_c + R_L} i_{n,L}\right)^2}$$

The electrical resistance $R_L$ is negligible with respect to the electrical resistance $R_c$, for at least two reasons: on the one hand, the electrical resistivity $\rho_L$ is lower than or equal to 10% of the electrical resistivity $\rho_c$, and for example equal to about $\rho_c/200$ in the case of implanted nitrogen; on the other hand, the length of the central segment 14.1 in the direction of flow of the electric current is larger than that of the lateral segments 14.2, and for example 10 to 20 times larger. As a result, the ratio $R_c/R_L$ between the electrical resistances may be comprised between about 1000 and 2000, in particular in the case of implanted nitrogen.

By way of example, in the case of an $R_c/R_L$ ratio equal to 1500, the previous equation becomes:

$$i_{n,tot} = \sqrt{(6.67 \cdot 10^{-4} \times i_{n,L})^2 + (9.99 \cdot 10^{-1} \times i_{n,c})^2}$$

Thus, in the case where the noise $i_{n,L}$ in the lateral segments 14.2 is comprised between 1 and 100 times the noise $i_{n,c}$ in the central segment 14.1, this leads to the total noise $i_{n,tot}$ associated with the thermistor material 14 being substantially equal to the noise $i_{n,c}$ of the central segment 14.1 to within 2.2‰.

It would therefore appear that greatly decreasing the electrical resistivity $\rho_L$ at room temperature of the lateral segments 14.2 of the thermistor material 14 allows the excess noise generated in the lateral segments 14.2 to be counteracted This excess noise is not physically removed, but the low electrical resistivity $\rho_L$ makes it possible to make its impact on the total noise almost non-existent. This is thus obtained by means of the localized ion implantation of the additional chemical element A into the thermistor material 14, and not by incorporation of this chemical element A during growth. The performance of the microbolometer 1 is thus improved.

In addition, the central and lateral segments of different electrical resistivities are obtained from the same thermistor material 14 and not by different steps of depositing two separate thermistor materials having different electrical resistivities and electrically connected to one each other, thus simplifying the fabricating process.

Moreover, it would appear that the large decrease, by a factor of ten, in the electrical resistivity $\rho_L$ of the thermistor material 14 in the lateral segments 14.2 is obtained directly after the ion implantation step, without it being necessary to perform an anneal to heal implantation defects. Such an anneal may lead to an undesired modification of the properties of the thermistor material 14.

It would also appear that it is possible to produce apertures 13*a* in the intermediate insulating layer 13 of larger height, and indeed of a height so large that the noise $i_{n,L}$ in the lateral segments 14.2 is of the order of 220 times the noise $i_{n,c}$ of the central segment 14.1. The total noise $i_{n,tot}$ associated with the thermistor material 14 as a result is then equal to about 1.01 times the noise $i_{n,c}$ of the central segment 14.1. This is particularly advantageous when the intermediate insulating layer 13 extends into the thermally insulating arms and participates, with the lower insulating layer 11, in encapsulating an electrically conductive layer. It is then possible to produce an intermediate insulating layer 13 of larger thickness making it possible to improve the stiffness of the thermally insulating arms, or even of a thickness substantially equal to that of the lower insulating layer 11 with the aim of improving the mechanical stability of the thermally insulating arms.

The fabricating process according to the invention differs from that described in document US2010/0243896A1 essentially in that the apertures 13*a* in which the thermistor material 14 is located are located plumb with the absorbent membrane 10, and are not located above the anchoring pillars as described in that document. In that document, the VOx material located above the anchoring pillars and in the thermally insulating arms are in thermal short-circuit with the substrate: it therefore does not participate in the detection of the electromagnetic radiation of interest. In addition, the segments of VOx of three-dimensional topology are located above the anchoring pillars and the metal thereof, and hence they a fortiori do not participate in the detection of the electromagnetic radiation of interest. The sought electrical resistivity after the ion implantation is of the order of $10^3$ to $10^{-2}$ Ω·cm.

In contrast, in the context of the fabricating process according to the invention, the segments 14.2 of the thermistor material 14 of three-dimensional topology are located in the absorbent membrane 10. They are therefore thermally insulated from the substrate by the thermally insulating arms 5 and participate in detecting the electromagnetic radiation. The ion implantation in these segments 14.2 makes it possible to decrease the impact of the 1/f noise present in these segments 14.2. The electrical resistivity of the two-dimensional segment 14.1 is preferably comprised between 5 and 50 Ω·cm, and that of the three-dimensional segments 14.2 has an electrical resistivity for example of the order of 0.05 Ω·cm, so as to preserve a TCR coefficient favorable to the detection of the electromagnetic radiation, while decreasing the impact of 1/f noise. The thermistor material 14 is biased via electrodes 12 that are made of a metal, and not via VOx segments that extend into the thermally insulating arms 5 and that make contact with the anchoring pillars 4.

Particular embodiments have just been described. Various modifications and variants will appear obvious to anyone skilled in the art.

The invention claimed is:

1. A fabricating process for fabricating a microbolometer, the process comprising:
   producing anchoring pillars that each extend from a substrate, and that each comprise a corresponding electrical conductor;
   producing thermally insulating arms that each comprise a corresponding layer of a metal making contact with the corresponding electrical conductor of the corresponding anchoring pillar, forming a corresponding biasing electrode;
   producing a membrane to be suspended above the substrate by the anchoring pillars and the thermally insulating arms, the membrane including:
      the biasing electrodes,
      an intermediate insulating layer, which partially covers the biasing electrodes and contains corresponding apertures that open onto the corresponding biasing electrodes, and
      a thermistor material, which is made of a first compound based on vanadium oxide and which is continuously formed from a central segment that covers the intermediate insulating layer, and from corresponding lateral segments that make contact with the corresponding biasing electrodes through the apertures;
   determining a non-zero effective amount of an additional chemical element that, when incorporated by an ion implantation process into the first compound, forms a modified compound, wherein an electrical resistivity of the modified compound, at room temperature, is lower than or equal to 10% of an electrical resistivity, at room temperature, of the first compound; and
   incorporating locally, by the ion implantation process, into the lateral segments of the thermistor material, an amount of the additional chemical element higher than or equal to the effective amount.

2. The fabricating process as claimed in claim 1, wherein the additional chemical element is one of nitrogen, carbon, silicon, phosphorus, germanium, and arsenic.

3. The fabricating process as claimed in claim 1, wherein the additional chemical element is one of nitrogen and carbon.

4. The fabricating process as claimed in claim 1, wherein the additional chemical element is nitrogen.

5. The fabricating process as claimed in claim 1, wherein the thermistor material comprises a substantially identical amount x of oxygen in the central segment and in the lateral segments, x being a proportion of oxygen with respect to vanadium.

6. The fabricating process as claimed in claim 1, wherein the thermistor material comprises an amount x of oxygen such that the electrical resistivity at room temperature of the first compound of the thermistor material in the central segment is comprised between 5 $\Omega$·cm and 50 $\Omega$·cm, x being a proportion of oxygen with respect to vanadium.

7. The fabricating process as claimed in claim 6, wherein the amount x of oxygen is between 1.6 and 2.2.

8. The fabricating process as claimed in claim 1, wherein the modified compound of the thermistor material comprises an amount of the additional chemical element that is higher than or equal to 0.045, the amount being a proportion of the additional chemical element with respect to vanadium.

9. The fabricating process as claimed in claim 1, wherein the ion implantation process comprises depositing, on the thermistor material, a photoresist containing implantation apertures located facing the apertures in the intermediate insulating layer, the photoresist having a thickness so as to prevent the additional chemical element from being incorporated into the central segment.

* * * * *